May 25, 1926.
W. J. BRAY
1,585,962
CLUTCH LEVER RETAINING DEVICE
Filed Feb. 21, 1925    2 Sheets-Sheet 2
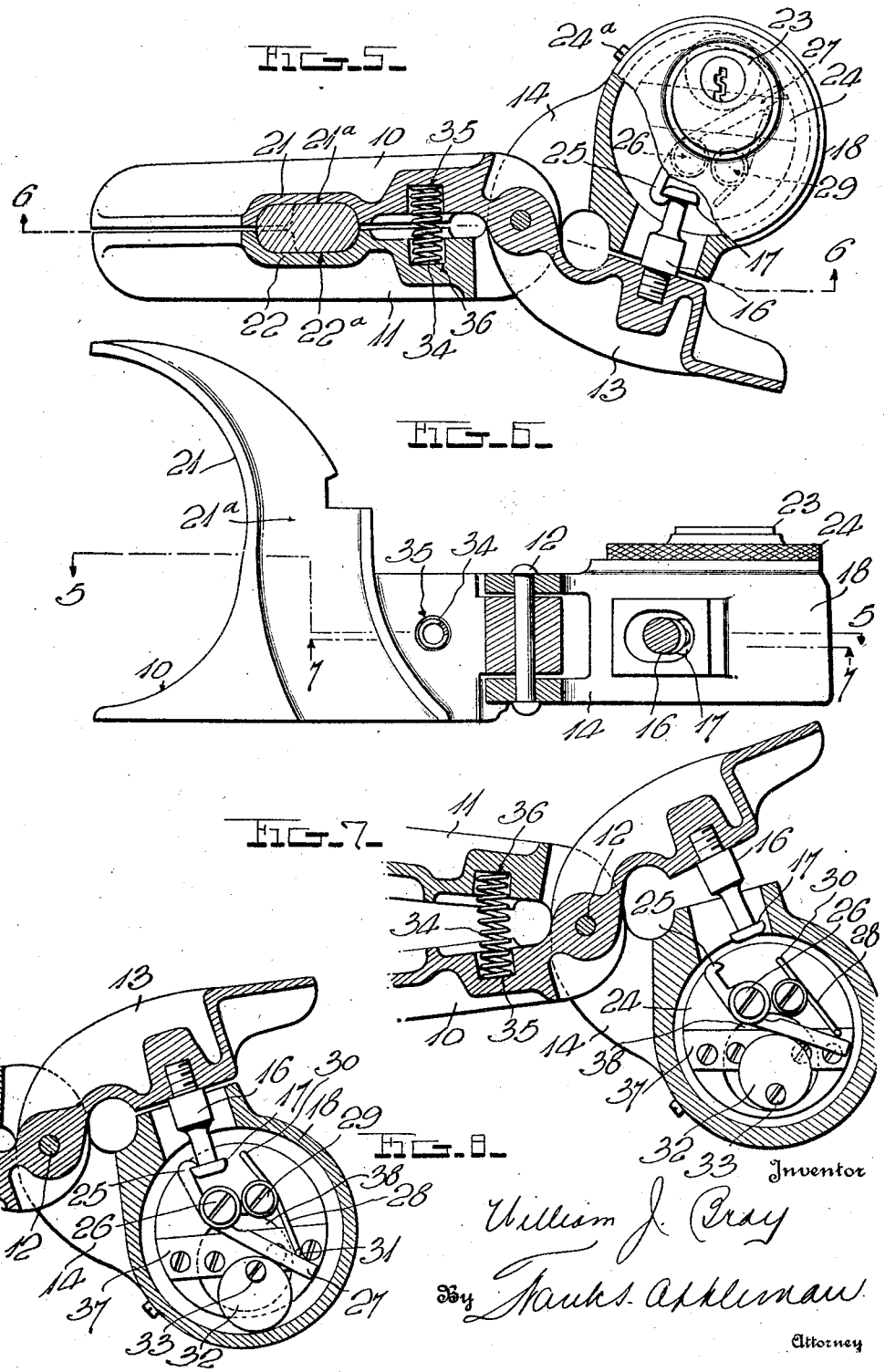

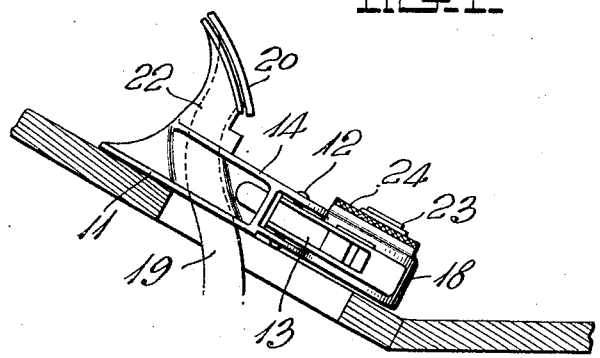
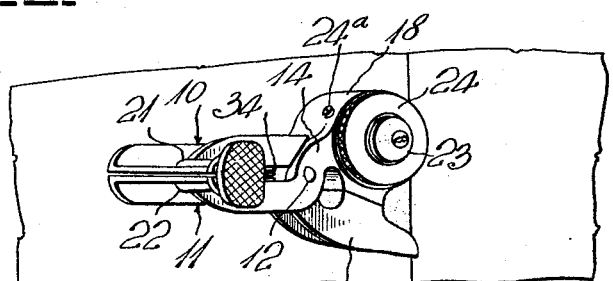
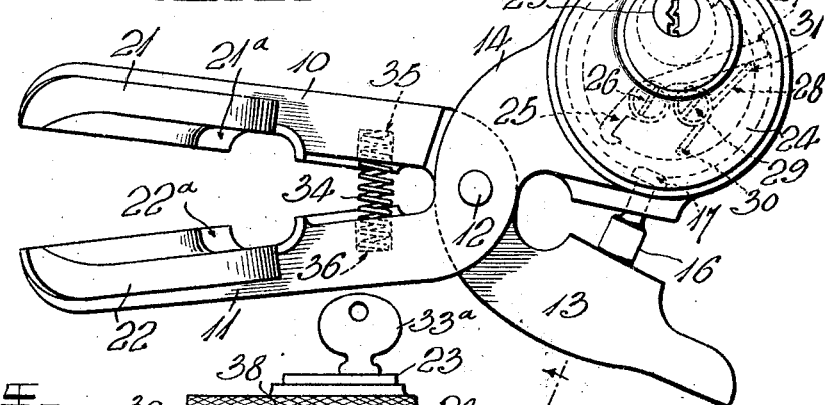
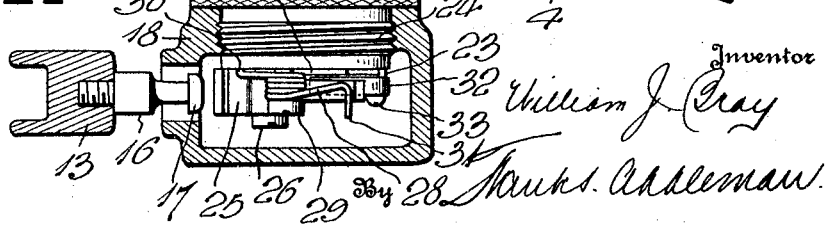

Patented May 25, 1926.

1,585,962

UNITED STATES PATENT OFFICE.

WILLIAM J. BRAY, OF LYNCHBURG, VIRGINIA.

CLUTCH-LEVER-RETAINING DEVICE.

Application filed February 21, 1925. Serial No. 10,934.

This invention relates to locks for pedals of automobiles, and particularly to a device for retaining a clutch pedal of a well known type of automobile inoperative to prevent shifting of the gears, as when the automobile is started.

It is an object of this invention to produce novel means readily applied to or removed from a clutch pedal, the said device having novel means whereby the parts are held in locked position while engaging the clutch pedal to prevent movement of the said clutch pedal.

It is a further object of this invention to produce a clutch pedal retaining device of the character indicated which can be expeditiously maniplated for the purposes just stated, the said device having novel means for operating the lever engaging elements when the locking means is released; and it is a still further object of this invention to produce locking means which cannot be readily released by unauthorized persons, or those without keys fitting the particular lock installed on one of the devices.

It is furthermore an object of this invention to produce a lever retaining device which is simple in its construction, comparatively light, and inexpensive.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation showing a clutch lever and a retaining device embodying the invention applied thereto;

Figure 2 illustrates a plan view thereof;

Figure 3 illustrates an enlarged plan view of the lever retaining device in open position;

Figure 4 illustrates a sectional view on the line 4—4 of Fig. 3;

Figure 5 illustrates a sectional view of the device applied to a lever, on the line 5—5 of Fig. 6;

Figure 6 illustrates a sectional view on the line 6—6 of Fig. 5;

Figure 7 illustrates a sectional view of a fragment of the device on the line 7—7 of Fig. 6 with the parts released; and Figure 8 illustrates a sectional view of a fragment of the device with the elements locked together.

In the present embodiment of the invention, the clutch lever engaging elements consist of two arms 10 and 11 oscillatably mounted on a pivot 12 with offset ends 13 and 14, respectively, beyond the pivot. The end 13 of the arm 10 has a stud 16 secured in it, and the said stud has a flanged head 17.

The offset end 14 of the arm 11 is shaped to form a casing 18, and the said casing houses a locking mechanism for holding the arms in proximity to each other and in operative positions to embrace a clutch lever shank 19 whose foot plate 20 lies above the upstanding portions 21 and 22 of the arms 10 and 11, respectively. The inner surfaces of the upstanding portions 21 and 22, as well as the inner surfaces of the arms are provided with recesses 21$^a$ and 22$^a$, respectively, to form clearances for the shank which the arms embrace, and the upper edges of the arms may be shaped to the configuration of the foot plate which is located thereabove when the lever retaining device is in operative position.

The lock for holding the arms in operative position coacts with the stud 16, and as illustrated in the application, a lock barrel 23 is secured in a plug or cap 24 that is threaded in the casing 18. After the plug has been applied to the casing, it may be prevented from being unscrewed by an appropriate locking pin 24$^a$ or the like. A latch 25 is pivotally mounted on a stud 26, which stud has its ends anchored in the inner end of the plug, and the said latch engages the head 17 of the stud 16 when the device is to be locked in position. The latch has a tail-piece 27, under pressure of a spring 28 tending to force the latch into engagement with the head of the stud 16 and to retain it in said position, the said spring being coiled on a stud or pin 29 and having one end 30 anchored in the plug. The opposite end 31 of the spring bears against the tail-piece of the latch for the purpose stated.

As the lock mechanism is rotated in the barrel, a cam 32 is rotated by it, the said cam being secured to the lock mechanism in any appropriate manner, as by a screw 33. The relation of parts is such that the cam operates the latch by engaging the tail-piece on the side opposite that engaged by the end 31 of the spring, and when the latch is to release the stud 16, a key 33ᵃ in the lock may be manipulated to rotate the cam from the position in which it is shown in Fig. 7 of the drawings to the position in which it is shown in Fig. 8 thereof, so that when the stud 16 is carried into the housing by the closing of the arms, the latch will engage the head of the stud to retain the parts in their locked positions.

When the key is manipulated in the lock to turn the cam in the position in which it is shown in Fig. 7, the arms will be forced apart by a spring 34 lying between the said arms, the said spring having its ends seated in recesses 35 and 36 of the arms 10 and 11, respectively.

A plate 37 is secured on the inner face of the plug and it extends across the cavity 38 in the said plug that is occupied by the lock barrel.

From an inspection of the drawing and from the foregoing description, it will be apparent that when the clutch lever shank is located in the recesses of the arms and the upstanding portions of the arms, the pedal cannot be forced downwardly, and therefore, the clutch cannot be released for the purpose of shifting gears, and this is especially true with respect to a well known make of car now in common use, and when in such position, the parts will be held by the lock against movement until the lock is manipulated to cause the latch 25 to release the head of the stud 16, after which the arms will be forced apart by the spring 34 in order that the lever engaging device may be removed to permit the clutch lever to be manipulated.

I claim:

In a retaining device for clutch levers, arms having upstanding portions with edges adapted to conform to and engage the under surface of a foot plate of a clutch lever and operative to practically fill the space between the under surface of said foot plate and the floor board of an automobile, the said arms and upstanding portions being complementally recessed to receive the shank of the clutch lever, a pivot connecting the said arms, an extension on each arm beyond the pivot, a stud having a flanged head anchored to and extending from one of the said extensions, a housing having an aperture to receive the stud on the other extension, and a lock located in the housing and having a latch to engage the head of the stud for holding the arms in positions embracing the shank of the clutch lever, substantially as described.

WILLIAM J. BRAY.